(12) United States Patent
Wang et al.

(10) Patent No.: US 8,577,220 B1
(45) Date of Patent: Nov. 5, 2013

(54) METHOD AND SYSTEM FOR PROTECTING AGAINST COMMUNICATION LOSS IN AN OPTICAL NETWORK SYSTEM

(75) Inventors: Weyl K. Wang, Duluth, GA (US); James O. Farmer, Cumming, GA (US)

(73) Assignee: Aurora Networks, Inc., Santa Clara, CA (US)

( * ) Notice: Subject to any disclaimer, the term of this patent is extended or adjusted under 35 U.S.C. 154(b) by 1227 days.

(21) Appl. No.: 12/396,030

(22) Filed: Mar. 2, 2009

Related U.S. Application Data

(60) Provisional application No. 61/067,542, filed on Feb. 28, 2008.

(51) Int. Cl.
*H04B 10/00* (2013.01)
(52) U.S. Cl.
USPC ................................. 398/5; 398/19; 398/72
(58) Field of Classification Search
USPC ............................................................. 398/5
See application file for complete search history.

(56) References Cited

U.S. PATENT DOCUMENTS

| | | | |
|---|---|---|---|
| 7,865,077 B2* | 1/2011 | Mukojima | 398/1 |
| 2005/0074241 A1* | 4/2005 | Farmer et al. | 398/72 |

* cited by examiner

*Primary Examiner* — Xinning Niu
(74) *Attorney, Agent, or Firm* — Smith Risley; Steven P. Wigmore

(57) ABSTRACT

A method and system for protecting against communication loss or disruption in an optical network system includes a signal state detector, which can measure received optical signals and determine if their strength is sufficient to support reliable communications. If the signal state detector informs the control circuit that the received optical signal is too low to support communications with the data service hub (or if there is no signal at all, such as in a severance of an optical waveguide), then the control circuit can instruct the data switch to re-route communications from the primary communication path to a secondary or back up communication path. This switching or re-routing of communications from a primary communication path which is non-functional or inoperative to an operational and fully functional communication path (a back up or secondary communication path) can be completed in a very short time, such as within fifty milliseconds or less.

16 Claims, 12 Drawing Sheets

STATE CHART ←—1300

| | State 1 | State 2 | State 3 | State 4 |
|---|---|---|---|---|
| Primary Path | UP | UP to Down | Down to Up | UP |
| Secondary Path | UP | UP | UP | UP to Down |
| SOI 140 | Primary Path | Primary to Secondary | Secondary to Primary | Primary Path |
| Data Service Hub Alarm | NO | YES | NO | YES |

155 — (Primary Path)
165 — (Secondary Path)

*FIG. 13*

METHOD AND SYSTEM FOR PROTECTING AGAINST COMMUNICATION LOSS IN AN OPTICAL NETWORK SYSTEM

STATEMENT REGARDING RELATED APPLICATIONS

The present application claims priority to provisional patent application entitled, "PON Protection with Fast Switching," filed an Feb. 28, 2008 and assigned U.S. application Ser. No. 61/067,542; the entire contents of which are incorporated by reference.

TECHNICAL FIELD

The present invention relates to video, voice, and data communications. More particularly, the present invention relates to using passive optical networks (PONS) in high-reliability applications in which a subscriber is protected against a loss in communications by providing redundant communication paths between the subscriber location and a data service hub.

BACKGROUND

The increasing reliance on communication networks to transmit more complex data, such as voice and video traffic, is causing a very high demand for bandwidth. To resolve this demand for bandwidth, communication networks are relying more upon optical fibers to transmit this complex data. Conventional communication architectures that employ coaxial cables are slowly being replaced with communication networks that comprise only fiber optic cables. One advantage that optical fibers have over coaxial cables is that a much greater amount of information can be carried on an optical fiber.

The Fiber-to-the-home (FTTH) optical network architecture has been a dream of many data service providers because of the aforementioned capacity of optical fibers that enable the delivery of any mix of high-speed services to businesses and consumers over highly reliable networks. Related to FTTH is fiber to the business (FTTB). FTTH and FTTB architectures are desirable because of improved signal quality, lower maintenance, and longer life of the hardware involved with such systems. However, in the past, the cost of FTTH and FTTB architectures have been considered prohibitive. But now, because of the high demand for bandwidth and the current research and development of improved optical networks, FTTH and FTTB have become a reality.

One example of a FTTH architecture that has been introduced by the industry is a passive optical network (PON). While the PON architecture does provide an all fiber network, it can have a few drawbacks which make such a system vulnerable to service losses. One drawback of the PON architecture is that because of its increased capacity for bandwidth in communications, when a PON architecture experiences a physical disruption to data flow, such as in a case of a severed optical fiber, more communications or services may be lost compared if a similar break were to occur with an electrical wire supporting communications.

With this increased volume or bandwidth supported by optical waveguides, it is extremely important that service be restored quickly for subscribers. According to current industry standards, the maximum amount of time that is permitted to switch from a broken communication path to a functional communication path is usually on the order of fifty milliseconds. Usually, if communication paths are switched within this short time frame, then such switching is transparent or is not perceivable by the subscriber.

Accordingly, there is a need in the art for a method and system for protecting against communication loss or disruption in an optical network system by switching from a broken communication path to a functional communication path in a very short time period, such as on the order of fifty milliseconds or less. There is also a need in the art for a method and system that can support primary and secondary communication paths in an optical network system in which the secondary communication paths can be automatically accessed when the primary communication paths have become non-functional and unable to support communications between a subscriber and a data service hub.

SUMMARY OF THE INVENTION

A method and system for protecting against communication loss or disruption in an optical network system can include a subscriber optical interface comprising a data switch, a control circuit, and a signal state detector. The signal state detector can measure received optical signals and determine if their strength is sufficient to support reliable communications. If the signal state detector informs the control circuit that the received optical signal is too low to support communications with the data service hub (or if there is no signal at all, such as in a severance of an optical waveguide), then the control circuit can instruct the data switch to re-route communications from the primary communication path to a secondary or back up communication path. This switching or re-routing of communications from a primary communication path which is non-functional or inoperative to an operational and fully functional communication path (a back up or secondary communication path) can be completed in a very short time, such as on the order of fifty milliseconds or less.

The primary and secondary communication paths may be defined through one or more virtual local area networks (VLANs) as understood to one of ordinary skill in the art. According to one exemplary embodiment, the primary and secondary communication paths may be part of a single VLAN. According to another exemplary embodiment, the primary and secondary communication paths may be part of two different VLANs, in which the first communication path is part of a first VLAN and the second communication path is part of a second VLAN. In either exemplary embodiment, the data switch can be instructed by the control circuit to route communications from the primary communication path to the secondary communication path if the first communication path becomes non-functional or inoperable for supporting reliable communications.

According to one exemplary aspect, each secondary or back up communication path can comprise a separate passive optical network relative to the primary communication path. That is, each secondary communication path can comprise a laser transceiver node, an optical tap, and a subscriber optical interface. According to another exemplary aspect, each secondary or back up communication path can comprise fewer components which form less than a separate passive optical network relative to the primary communication path. That is, each secondary communication path can comprise redundant equipment starting from the laser transceiver node and down to the subscriber. This means that such a secondary communication path may comprise an optical tap and a subscriber optical interface.

According to another exemplary aspect, the secondary communication path may comprise a bandwidth that is less than a bandwidth of the primary communication path. In such an exemplary embodiment, if data communications are categorized into two different classes, such as high priority and low priority, then the secondary communication path can be designed to support only high priority data traffic when the primary communication path having a greater bandwidth than the secondary communication path becomes non-functional or inoperable for communications. In this way, the secondary communication path may have less hardware and/or software and therefore, it may have reduced costs relative to a secondary communication path which may have the exact same bandwidth as a primary communication path.

BRIEF DESCRIPTION OF THE DRAWINGS

FIG. 13 illustrates a chart highlighting various states of a primary communication path and a secondary communication path according to an exemplary embodiment of the invention.

DETAILED DESCRIPTION OF EXEMPLARY EMBODIMENTS

Figure 1:
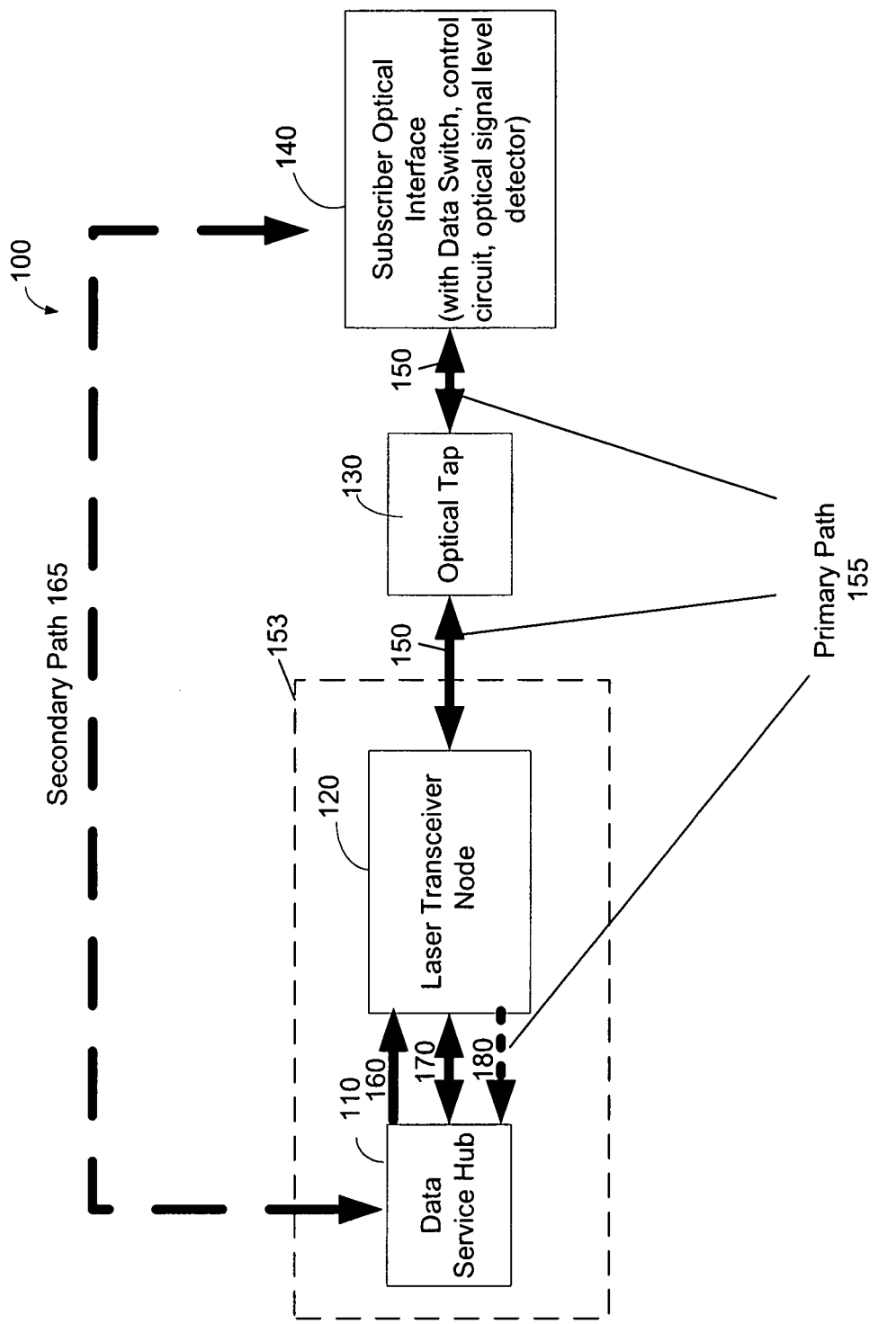
FIG. 1 is a functional block diagram illustrating an exemplary optical network architecture according to one exemplary embodiment of the invention.

Referring now to the drawings, in which like numerals represent like elements throughout the several Figures, aspects of the present invention and the illustrative operating environment will be described.

FIG. 1 is a functional block diagram illustrating an exemplary optical network architecture 100 according to the present invention. The exemplary optical network architecture 100 comprises a data service hub 110 that is connected to laser transceiver nodes 120. According to one exemplary embodiment, the laser transceiver nodes 120 are usually indoor devices and collocated with the Data Service hub 110 as indicated by dashed box 153. However, laser transceiver nodes 120 which are not collocated with the Data Service Hub 110 are not beyond the scope of the invention. The laser transceiver nodes 120, in turn, are connected to optical taps 130. The optical taps 130 can be connected to a plurality of subscriber optical interfaces 140.

Within each subscriber optical interface 140 can be a data switch, a control circuit, and an optical signal level detector according to exemplary embodiments of the invention. Between respective components of the exemplary optical network architecture 100 are optical waveguides such as optical waveguides 150, 160, 170, and 180. The link between the data service hub 110 and laser transceiver nodes 120 may be optical or they may be electrical. The optical waveguides 150-180 are illustrated by arrows where the arrowheads of the arrows illustrate exemplary directions of data flow between respective components of the illustrative and exemplary optical network architecture 100.

A primary communication path 155 can be defined as follows: the optical waveguides 160, 170, 180 between the data service hub 110 and laser transceiver node 120; by the optical waveguide 150 between the laser transceiver node 120 and the optical tap 130; and by the optical waveguide 150 between the optical tap 130 and the subscriber optical interface 140. A secondary communication path 165 can exist between the subscriber optical interface 140 and the data service hub 110. This secondary communication path 165 can comprise a completely separate passive optical network that has its own subscriber optical interface 140, optical tap 130, and laser transceiver node 120 (not illustrated in FIG. 1, but see FIG. 6).

Figure 8:
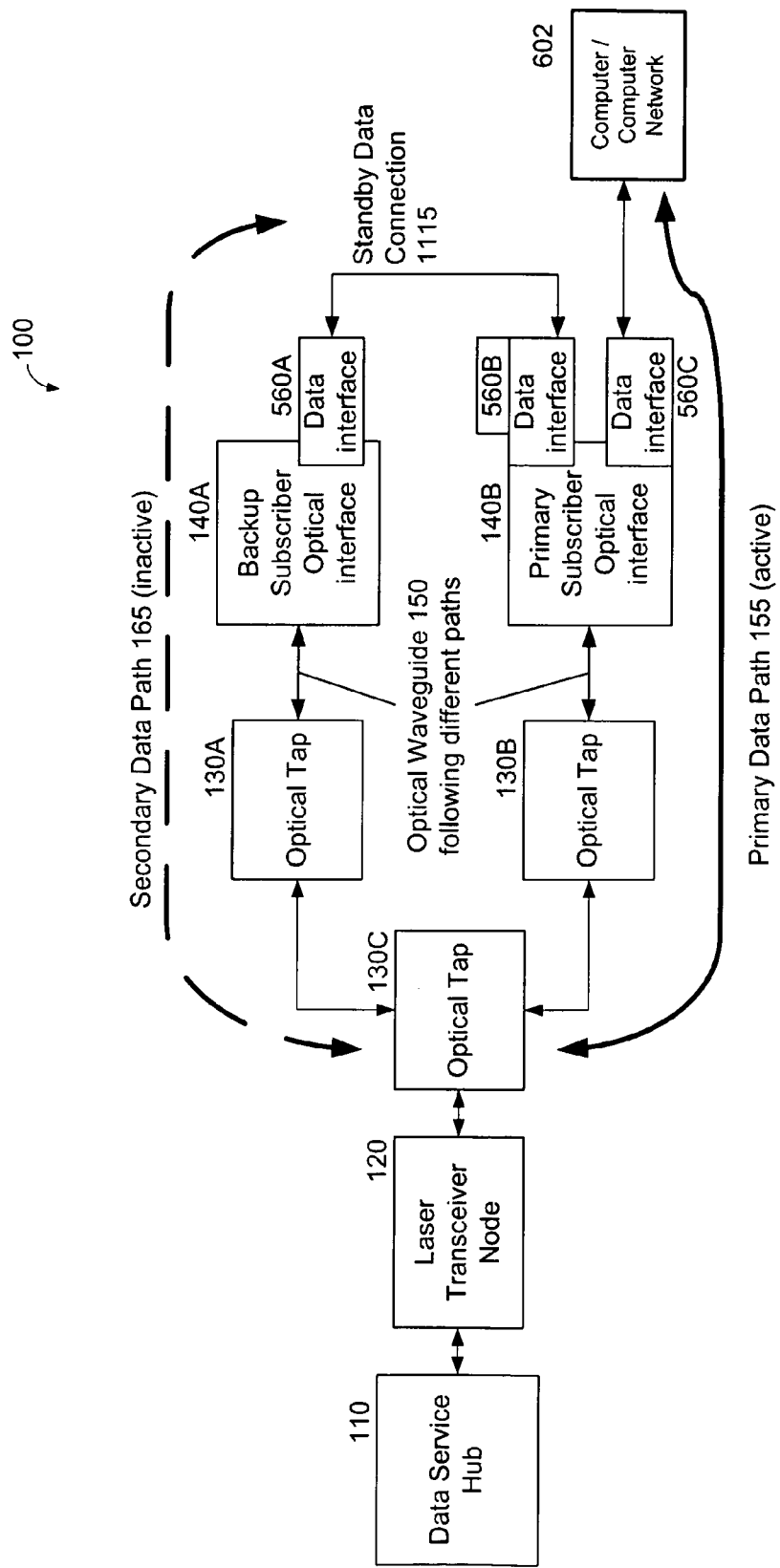
FIG. 8 is a functional block diagram illustrating an active primary communication path comprising a passive optical network (PON) and an inactive secondary communication path comprising hardware that is coupled to the same passive optical network (PON) of the primary communication path according to one exemplary embodiment of the invention.

According to another exemplary embodiment, the secondary communication path 165 may comprise hardware that is coupled to the laser transceiver node 120 and that may include an optical tap 130 and another subscriber optical interface 140 (not illustrated in FIG. 1, but see FIG. 8). Further details of the secondary communication path 165 will be described in detail below.

The laser transceiver node 120 provides interface between standard (usually, but not limited to, Ethernet) data interfaces and the unique data protocols on the PON. The PON comprises from the output of the laser transceiver node 120, through the subscriber optical interface 140, and includes the optical tap 130, as well as the optical waveguide 150.

Figure 2:
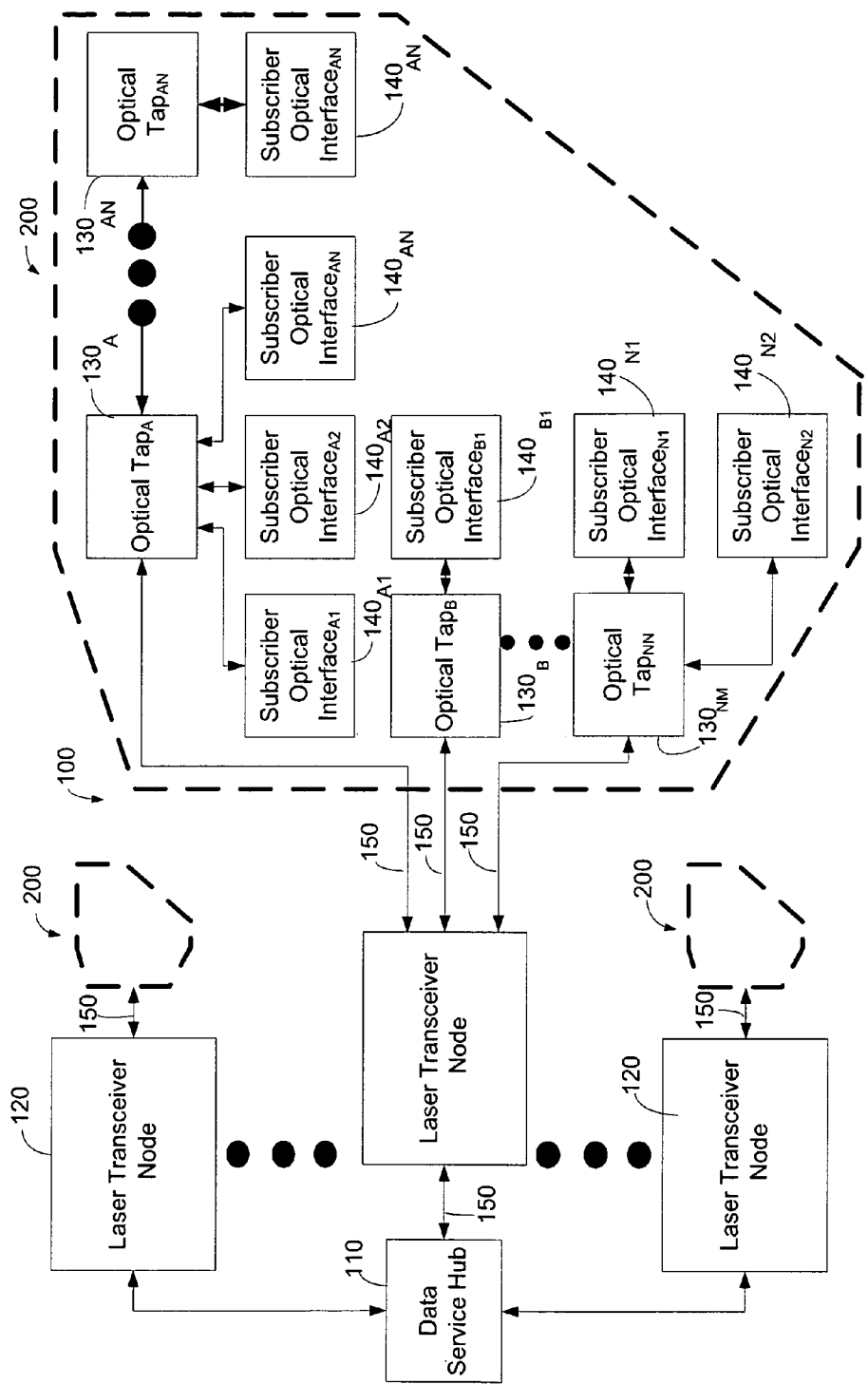
FIG. 2 is a functional block diagram illustrating an exemplary optical network architecture 100 that further includes subscriber groupings that correspond with a respective laser transceiver node according to one exemplary embodiment of the invention.

While only an individual laser transceiver node 120, an individual optical tap 130, and an individual subscriber optical interface 140 are illustrated in FIG. 1, as will become apparent from FIG. 2 and its corresponding description, a plurality of laser transceiver nodes 120, optical taps 130, and subscriber optical interfaces 140 can be employed without departing from the scope and spirit of the present invention. Typically, in many of the exemplary embodiments of the optical network architecture, multiple subscriber optical interfaces 140 are connected to one or more optical taps 130.

The laser transceiver node 120 can allocate additional or reduced bandwidth based upon the demand of one or more subscribers that use the subscriber optical interfaces 140. The laser transceiver node 120 can be designed to withstand outdoor environmental conditions and can be designed to hang on a strand or fit in a pedestal. The laser transceiver node 120 can operate in a temperature range between minus 40 degrees Celsius to plus 60 degrees Celsius. The laser transceiver node 120 can operate in this temperature range by using passive cooling devices that do not consume power.

In one exemplary embodiment of the optical architecture 100, three trunk optical waveguides 160, 170, and 180 can conduct optical signals from the data service hub 110 to the laser transceiver node 120. It is noted that the term "optical waveguide" used in this disclosure can apply to optical fibers, planar light guide circuits, and fiber optic pigtails and other like optical waveguides. As noted previously, in alternate exemplary embodiments, the link between the data service hub 110 and the laser transceiver node 120 may be electrical in which wires are used.

A first optical waveguide 160 can carry broadcast video and other signals. The signals can be carried in a traditional cable television format wherein the broadcast signals are modulated onto carriers, which in turn, modulate an optical transmitter (not illustrated) in the data service hub 110. A second optical waveguide 170 can carry downstream targeted services such as data and telephone services to be delivered to one or more subscriber optical interfaces 140. In addition to carrying subscriber-specific optical signals, the second optical waveguide 170 can also propagate internet protocol broadcast packets, as is understood by one of ordinary skill in the art.

In one exemplary embodiment of the optical network architecture, a third optical waveguide 180 can transport data signals upstream from the laser transceiver node 120 to the data service hub 110. The optical signals propagated along the third optical waveguide 180 can also comprise data and telephone services received from one or more subscribers. Similar to the second optical waveguide 170, the third optical waveguide 180 can also carry IP broadcast packets, as is understood by those skilled in the art.

The third or upstream optical waveguide 180 is illustrated with dashed lines to indicate that it is merely an option or part of one exemplary embodiment. In other words, the third optical waveguide 180 can be removed. In another exemplary embodiment, the second optical waveguide 170 propagates optical signals in both the upstream and downstream directions as is illustrated by the double arrows depicting the second optical waveguide 170. In such an exemplary embodiment where the second optical waveguide 170 propagates bidirectional optical signals, only two optical waveguides 160, 170 would be needed to support the optical signals propagating between the data server's hub 110 in the laser transceiver node 120.

In an exemplary embodiment (not illustrated), a single optical waveguide can be the only link between the data service hub 110 and the laser transceiver node 120. In such a single optical waveguide embodiment, three different wavelengths can be used for the upstream and downstream signals. Alternatively, bi-directional data could be modulated on two wavelengths, one for upstream and one for downstream. In such an embodiment, the down stream wavelength can be 1490 or 1510 nanometers. The upstream optical wavelengths can be 1310 nanometers. However, other magnitudes for the wavelengths for both upstream and downstream directions are not beyond the scope of the invention.

In one exemplary embodiment, the optical tap 130 of the optical architecture 100 can comprise various types of splitters such as an eight-way and thirty-two way type optical splitter. This means that the optical tap 130 comprising an eight-way optical splitter can divide downstream optical signals eight ways to serve eight different subscriber optical interfaces 140. Similarly, a thirty-two way type optical tap 130 can divide downstream optical signals thirty-two ways to serve thirty-two different subscriber optical interfaces 140. In the upstream direction, the optical tap 130 can combine the optical signals received from the subscriber optical interfaces 140.

In another exemplary embodiment of the system, the optical tap 130 can comprise a 4-way splitter to service four subscriber optical interfaces 140. Yet in another exemplary embodiment, the optical tap 130 can further comprise a 4-way splitter that is also a pass-through tap meaning that a portion of the optical signal received at the optical tap 130 can be extracted to serve the 4-way splitter contained therein while the remaining optical energy is propagated further downstream to another optical tap or another subscriber optical interface 140. The optical architecture 100 is not limited to 4-way and 8-way optical splitters. Other optical taps having fewer or more than 4-way or 8-way splits are not beyond the scope of the present invention.

Referring now to FIG. 2, this Figure is a functional block diagram illustrating an exemplary optical network architecture 100 that further includes subscriber groupings 200 that correspond with a respective laser transceiver node 120. FIG. 2 illustrates the diversity of the exemplary optical network architecture 100 where a number of optical waveguides 150 connected between the laser transceiver node 120 and the optical taps 130 is minimized. FIG. 2 also illustrates the diversity of subscriber groupings 200 that can be achieved with the optical tap 130.

Each optical tap 130 can comprise an optical splitter. The optical tap 130 allows multiple subscriber optical interfaces 140 to be coupled to a single optical waveguide 150 that is connected to the laser transceiver node 120. In one exemplary embodiment, six optical fibers 150 are designed to be connected to the laser transceiver node 120. Through the use of the optical taps 130, sixteen subscribers can be assigned to each of the six optical fibers 150 that are connected to the laser transceiver node 120.

In another exemplary embodiment, twelve optical fibers 150 can be connected to the laser transceiver node 120 while eight subscriber optical interfaces 140 are assigned to each of the twelve optical fibers 150. One of ordinary skill in the art will appreciate that the number of subscriber optical interfaces 140 assigned to a particular waveguide 150 that is connected between the laser transceiver node 120 and a subscriber optical interface 140 (by way of the optical tap 130) can be varied or changed without departing from the scope and spirit of the present invention. Further, those skilled in the art recognize that the actual number of subscriber optical interfaces 140 assigned to the particular fiber optic cable is dependent upon the amount of power available on a particular optical fiber 150.

As depicted in subscriber grouping 200, many configurations for supplying communication services to subscribers are possible. For example, while optical tap 130A can connect subscriber optical interfaces 140A1 through subscriber optical interface 140AN to the laser transmitter node 120, optical tap 130A can also connect other optical taps 130 such as optical tap 130AN to the laser transceiver node 120. The combinations of optical taps 130 with other optical taps 130 in addition to combinations of optical taps 130 with subscriber optical interfaces 140 are limitless within the practical restrictions posed by optical components and PON standards that are understood by one of ordinary skill in the art. With the optical taps 130, concentrations of distribution optical waveguides 150 at the laser transceiver node 120 can be reduced. Additionally, the total amount of fiber needed to service a subscriber grouping 200 can also be reduced.

With the active laser transceiver node 120 of the optical architecture 100, the distance between the laser transceiver node 120 and the data service hub 110 can comprise a range between 0 and 80 kilometers. However, the present invention is not limited to this range. Those skilled in the art will appreciate that this range can be expanded by selecting various off-the-shelf components that make up several of the devices of the present system.

One of ordinary skill in the art will appreciate that other configurations of the optical waveguides disposed between the data service hub 110 and laser transceiver node 120 are not beyond the scope of the present invention. Because of the bi-directional capability of optical waveguides, variations in the number and directional flow of the optical waveguides disposed between the data service hub 110 and the laser transceiver node 120 can be made without departing from the scope and spirit of the present invention.

Figure 3:
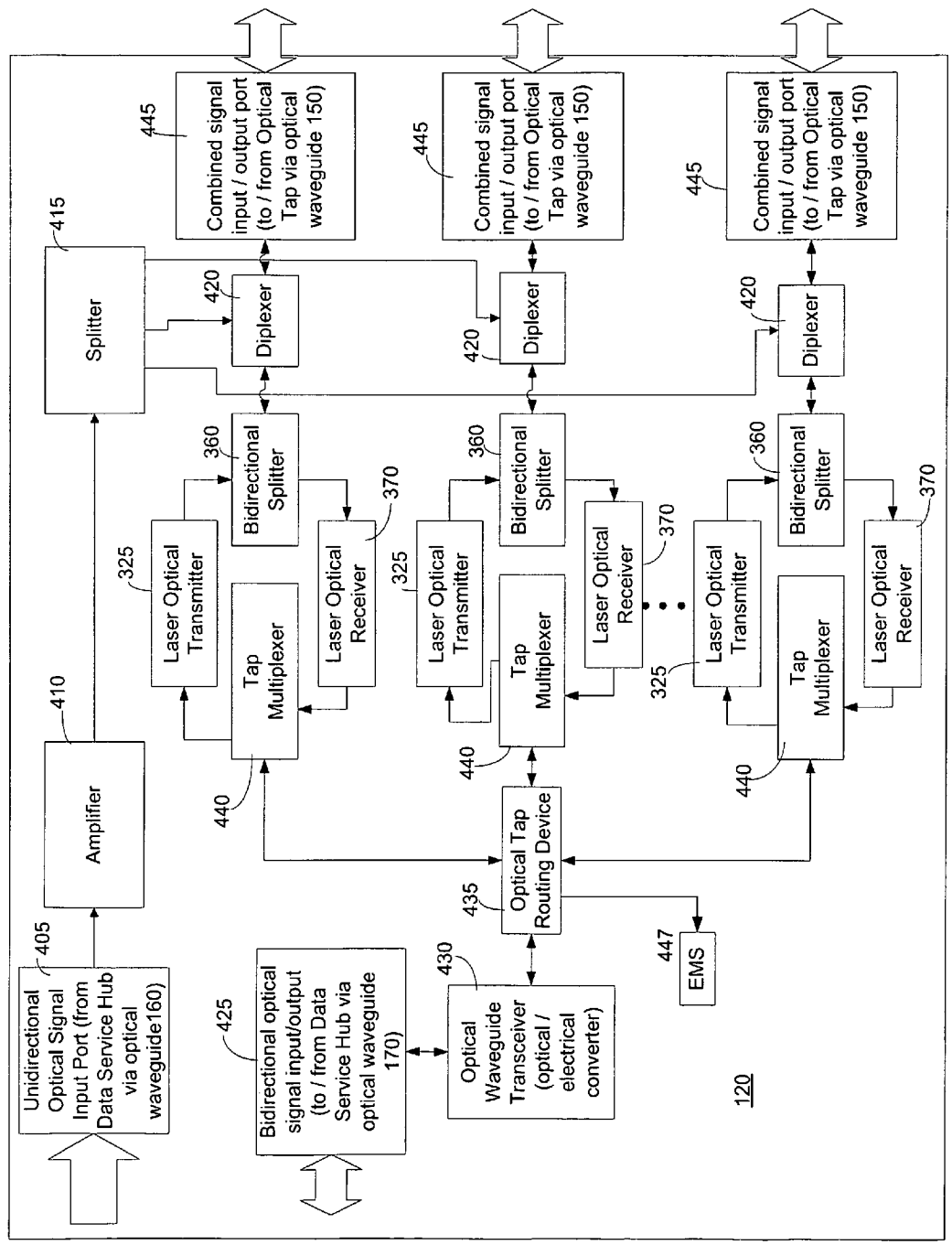
FIG. 3 illustrates a functional block diagram of an exemplary laser transceiver node of the optical network according to one exemplary embodiment of the invention.

Referring now to FIG. 3, this Figure illustrates a functional block diagram of an exemplary laser transceiver node 120 of the optical network 100. In this exemplary embodiment, the laser transceiver node 120 can comprise a unidirectional optical signal input port 405 that can receive optical signals propagated from the data service hub 110 that are propagated along a first optical waveguide 160. The optical signals received at the unidirectional optical signal input port 405 can comprise broadcast video data. The optical signals received at the input port 405 are propagated to an amplifier 410 such as an Erbium Doped Fiber Amplifier (EDFA) in which the optical signals are amplified. The amplified optical signals are then propagated to a splitter 415 that divides the broadcast video optical signals among diplexers 420 that are designed to forward optical signals to predetermined subscriber groups 200.

The laser transceiver node 120 can further comprise a bi-directional optical signal input/output port 425 that connects the laser transceiver node 120 to a second optical waveguide 170 that supports bi-directional data flow between the data service hub 110 and laser transceiver node 120. Downstream optical signals flow through the bidirectional optical signal input/output port 425 to an optical waveguide transceiver 430 that converts downstream optical signals into the electrical domain. The optical waveguide transceiver 430 further converts upstream electrical signals into the optical domain. The optical waveguide transceiver 430 can comprise an optical/electrical converter and an electrical/optical converter.

Downstream and upstream electrical signals are communicated between the optical waveguide transceiver 430 and an optical tap routing device 435. The optical tap routing device 435 can manage the interface with the data service hub optical signals and can route or divide or apportion the data service hub signals according to individual tap multiplexers 440 that communicate optical signals with one or more optical taps 130 and ultimately one or more subscriber optical interfaces 140. It is noted that tap multiplexers 440 operate in the electrical domain to modulate laser transmitters in order to generate optical signals that are assigned to groups of subscribers coupled to one or more optical taps.

The optical tap routing device can be coupled to an Element Management System (EMS) 447 that activates one or more alarms if certain equipment within the system 100 fails. Further details of the EMS 447 will be described below in connection with FIG. 7.

The optical tap routing device 435 is notified of available upstream data packets as they arrive, by each tap multiplexer 440. The optical tap routing device is connected to each tap multiplexer 440 to receive these upstream data packets. The optical tap routing device 435 relays the packets to the data service hub 110 via the optical waveguide transceiver 430. The optical tap routing device 435 can build a lookup table from these upstream data packets coming to it from all tap multiplexers 440 (or ports), by reading the source IP address of each packet, and associating it with the tap multiplexer 440 through which it came.

This lookup table can then be used to route packets in the downstream path. As each packet comes in from the optical waveguide transceiver 430, the optical tap routing device looks at the destination IP address (which is the same as the source IP address for the upstream packets). From the lookup table the optical tap routing device can determine which port is connected to that IP address, so it sends the packet to that port. This can be described as a normal layer three router function as is understood by one of ordinary skill in the art. Similarly packets can be switched according to their MAC addresses as a normal layer two switching function.

The optical tap routing device 435 can assign multiple subscribers to a single port. More specifically, the optical tap routing device 435 can service groups of subscribers with corresponding respective, single ports. The optical taps 130 coupled to respective tap multiplexers 440 can supply downstream optical signals to preassigned groups of subscribers who receive the downstream optical signals with the subscriber optical interfaces 140.

In other words, the optical tap routing device 435 can determine which tap multiplexer 440 is to receive a downstream electrical signal, or identify which of a plurality of optical taps 130 propagated an upstream optical signal (that is converted to an electrical signal). The optical tap routing device 435 can format data and implement the protocol required to send and receive data from each individual subscriber connected to a respective optical tap 130. The optical tap routing device 435 can comprise a computer or a hardwired apparatus that executes a program defining a protocol for communications with groups of subscribers assigned to individual ports.

One exemplary embodiment of the program defining the protocol is discussed in commonly assigned provisional patent application entitled, "Protocol to Provide Voice and Data Services via Fiber Optic Cable," filed on Oct. 27, 2000 and assigned U.S. application Ser. No. 60/243,978, the entire contents of which are incorporated by reference. Another exemplary embodiment of the program defining the protocol is discussed commonly assigned provisional patent application entitled, "Protocol to Provide Voice and Data Services via Fiber Optic Cable-Part 2," filed on May 7, 2001 and assigned U.S. application Ser. No. 60/289,112, the entire contents of which are incorporated by reference.

The single ports of the optical tap routing device are connected to respective tap multiplexers 440. With the optical tap routing device 435, the laser transceiver node 120 can adjust a subscriber's bandwidth on a subscription basis or on an as-needed or demand basis. The laser transceiver node 120 via the optical tap routing device 435 can offer data bandwidth to subscribers in pre-assigned increments. For example, the laser transceiver node 120 via the optical tap routing device 435 can offer a particular subscriber or groups of subscribers bandwidth in units of 1, 2, 5, 10, 20, 50, 100, 200, and 450 Megabits per second (Mb/s). Those skilled in the art will appreciate that other subscriber bandwidth units are not beyond the scope of the present invention.

Electrical signals are communicated between the optical tap routing device 435 and respective tap multiplexers 440. The tap multiplexers 440 propagate optical signals to and from various groupings of subscribers. Each tap multiplexer 440 is connected to a respective optical transmitter 325. Each optical transmitter 325 of the laser transceiver node can comprise one of a Fabry-Perot (F-P) laser, a distributed feedback laser (DFB), or a Vertical Cavity Surface Emitting Laser (VCSEL).

The optical transmitters 325 produce the downstream optical signals that are propagated towards the subscriber optical interfaces 140. Each tap multiplexer 440 is also coupled to an optical receiver 370. Each optical receiver 370, as noted above, can comprise photoreceptors or photodiodes. Each optical transmitter 325 and each optical receiver 370 are connected to a respective bidirectional splitter 360. Each bi-directional splitter 360 in turn is connected to a diplexer 420 which combines the unidirectional optical signals received from the splitter 415 with the downstream optical signals received from respective optical receivers 370.

In this way, broadcast video services as well as data services can be supplied with a single optical waveguide such as a distribution optical waveguide 150 as illustrated in FIG. 2. In other words, optical signals can be coupled from each respective diplexer 420 to a combined signal input/output port 445 that is connected to a respective distribution optical waveguide 150.

The laser transceiver node 120 can provide high speed symmetrical data transmissions. In other words, the laser transceiver node 120 can propagate the same bit rates downstream and upstream to and from a network subscriber. This is yet another advantage over conventional networks, which typically cannot support symmetrical data transmissions as discussed in the background section above. Further, the laser transceiver node 120 can also serve a large number of subscribers while reducing the number of connections at both the data service hub 110 and the laser transceiver node 120 itself.

Data intended for a user on a certain PON is switched by the respective optical tap routing device 435, to the appropriate PON, each PON having its own tap multiplexer 440, laser optical transmitter 325, and laser optical receiver 370. These are connected through a bidirectional splitter 360 and an optional diplexer 420, to a combined signal input/output port 445. Each combined signal input/output Port 445 defines a separate PON. One main objective of the inventive system 100 is that one PON may be used as a backup communication path for another PON. The termination of the backup communication path can be at the laser transceiver node 120, or it can extend back to the data service hub 110.

Figure 4:
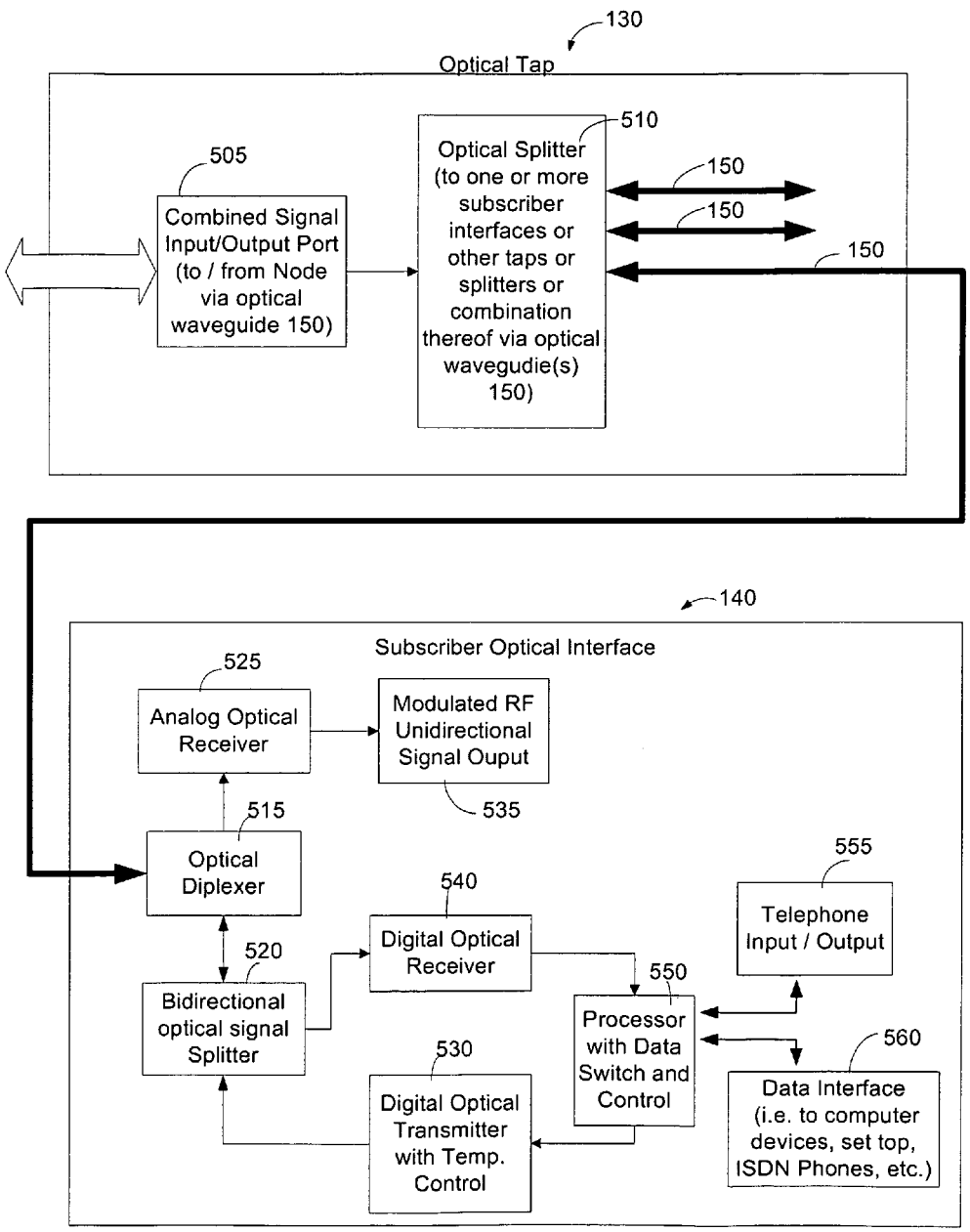
FIG. 4 is a functional block diagram illustrating an optical tap connected to a subscriber optical interface by a single optical waveguide according to one exemplary embodiment of the invention.

Referring now to FIG. 4, this Figure is a functional block diagram illustrating an optical tap 130 connected to a subscriber optical interface 140 by a single optical waveguide 150 according to one exemplary embodiment of the present invention. The optical tap 130 can comprise a combined signal input/output port that is connected to another distribution optical waveguide 150 that is connected to a laser transceiver node 120. As noted above, the optical tap 130 can comprise an optical splitter 510 that can be a 4-way or 8-way optical splitter. Other optical taps having fewer or more than 4-way or 8-way splits are not beyond the scope of the present invention.

The optical tap can divide downstream optical signals to serve respective subscriber optical interfaces 140. In the exemplary embodiment in which the optical tap 130 comprises a 4-way optical tap, such an optical tap can be of the pass-through type, meaning that a portion of the downstream optical signals is extracted or divided to serve a 4-way splitter contained therein, while the rest of the optical energy is passed further downstream to other distribution optical waveguides 150.

The optical tap 130 is an efficient coupler that can communicate optical signals between the laser transceiver node 120 and a respective subscriber optical interface 140. Optical taps 130 can be cascaded, or they can be connected in a star architecture from the laser transceiver node 120. As discussed above, the optical tap 130 can also route signals to other optical taps that are downstream relative to a respective optical tap 130.

The optical tap 130 can also connect to a limited or small number of optical waveguides 150 so that high concentrations of optical waveguides are not present at any particular laser transceiver node 120. In other words, the optical tap can connect to a limited number of optical waveguides 150 at a point remote from the laser transceiver node 120 so that high concentrations of optical waveguides 150 at a laser transceiver node can be avoided. However, one of ordinary skill in the art will appreciate that the optical tap 130 can be incorporated within the laser transceiver node 120.

The subscriber optical interface 140 functions to convert downstream optical signals received from the optical tap 130 into the electrical domain that can be processed with appropriate communication devices. The subscriber optical interface 140 further functions to convert upstream electrical signals into upstream optical signals that can be propagated along a distribution optical waveguide 150 to the optical tap 130. The subscriber optical interface 140 can comprise an optical diplexer 515 that divides the downstream optical signals received from the distribution optical waveguide 150 between a bidirectional optical signal splitter 520 and an analog optical receiver 525.

The optical diplexer 515 can receive upstream optical signals generated by a digital optical transmitter 530. This digital optical transmitter 530 can comprise one of a Fabry-Perot (F-P) laser, a distributed feedback laser (DFB), or a Vertical Cavity Surface Emitting Laser (VCSEL). The digital optical transmitter 530 can produce optical signals in the optical wavelength region between about 1260 nanometers (nm) and about 1360 nm. According to one exemplary and preferred embodiment, an optimum wavelength can comprise about 1312 nm, but other wavelengths higher and lower than this optimum wavelength are within the scope of the invention.

The digital optical transmitter 530 converts electrical binary/digital signals to optical form so that the optical signals can be transmitted back to the data service hub 110. Conversely, the digital optical receiver 540 converts optical signals into electrical binary/digital signals so that the electrical signals can be handled by processor 550.

The optical network architecture 100 can propagate the optical signals at various wavelengths. However, the wavelength regions discussed are practical and are only illustrative of exemplary embodiments. Those skilled in the art will appreciate that other wavelengths that are either higher or lower than or between the 1310 and 1550 nm wavelength regions are not beyond the scope of the present invention.

The analog optical receiver 525 can convert the downstream broadcast optical video signals into modulated RF television signals that are propagated out of the modulated RF unidirectional signal output 535. The modulated RF unidirectional signal output 535 can feed to RF receivers such as television sets (not shown) or radios (not shown). The analog optical receiver 525 can process analog modulated RF transmission as well as digitally modulated RF transmissions for digital TV applications.

The bi-directional optical signal splitter 520 can propagate combined optical signals in their respective directions. That is, downstream optical signals entering the bi-directional optical splitter 520 from the optical diplexer 515, are propagated to the digital optical receiver 540. Upstream optical signals entering it from the digital optical transmitter 530 are sent to optical diplexer 515 and then to optical tap 130. The bi-directional optical signal splitter 520 is connected to a digital optical receiver 540 that converts downstream data optical signals into the electrical domain. Meanwhile the bi-directional optical signal splitter 520 is also connected to a digital optical transmitter 530 that converts upstream electrical signals into the optical domain. The digital optical receiver 540 can comprise one or more photoreceptors or photodiodes that convert optical signals into the electrical domain.

The digital optical receiver 540 and digital optical transmitter 530 are connected to a processor 550 that selects data intended for the instant subscriber optical interface 140 based upon an embedded address. The data handled by the processor 550 can comprise one or more of telephony and data services such as an Internet service. The processor 550 is connected to a telephone input/output 555 that can comprise an analog interface. The processor 550 is also connected to a data interface 560 that can provide a link to computer devices, set top boxes, ISDN phones, and other like devices. The processor 550 can support and produce communication signals on the order of several Gigabits per second (Gb/s). For example, the processor 550 can support communications on the order of a few, tens, hundreds, and thousands of Gigabits per second. As of this writing, typical speeds are within the 100 to 1,000 Mb/s per second region, but it is anticipated that higher speeds will be achieved shortly.

Alternatively, the data interface 560 can be coupled to a Voice over Internet Protocol (VoIP) telephone. The data interface 560 can comprise one of Ethernet's (10BaseT, 100BaseT, Gigabit) interface, HPNA interface, a universal serial bus (USB) an IEEE1394 interface, an ADSL interface, and other like interfaces. One of ordinary skill in the art also recognizes that there may be more than one data interface 560 on a given subscriber optical interface 140.

Typical data interfaces 560 can conform to either the 10/100Base-T or 10/100/1000Base-T or the 1000Base-X standards that are a part of Ethernet, and are very familiar to one of ordinary skill in the art. Other interfaces are not beyond the scope of the invention.

Figure 5:
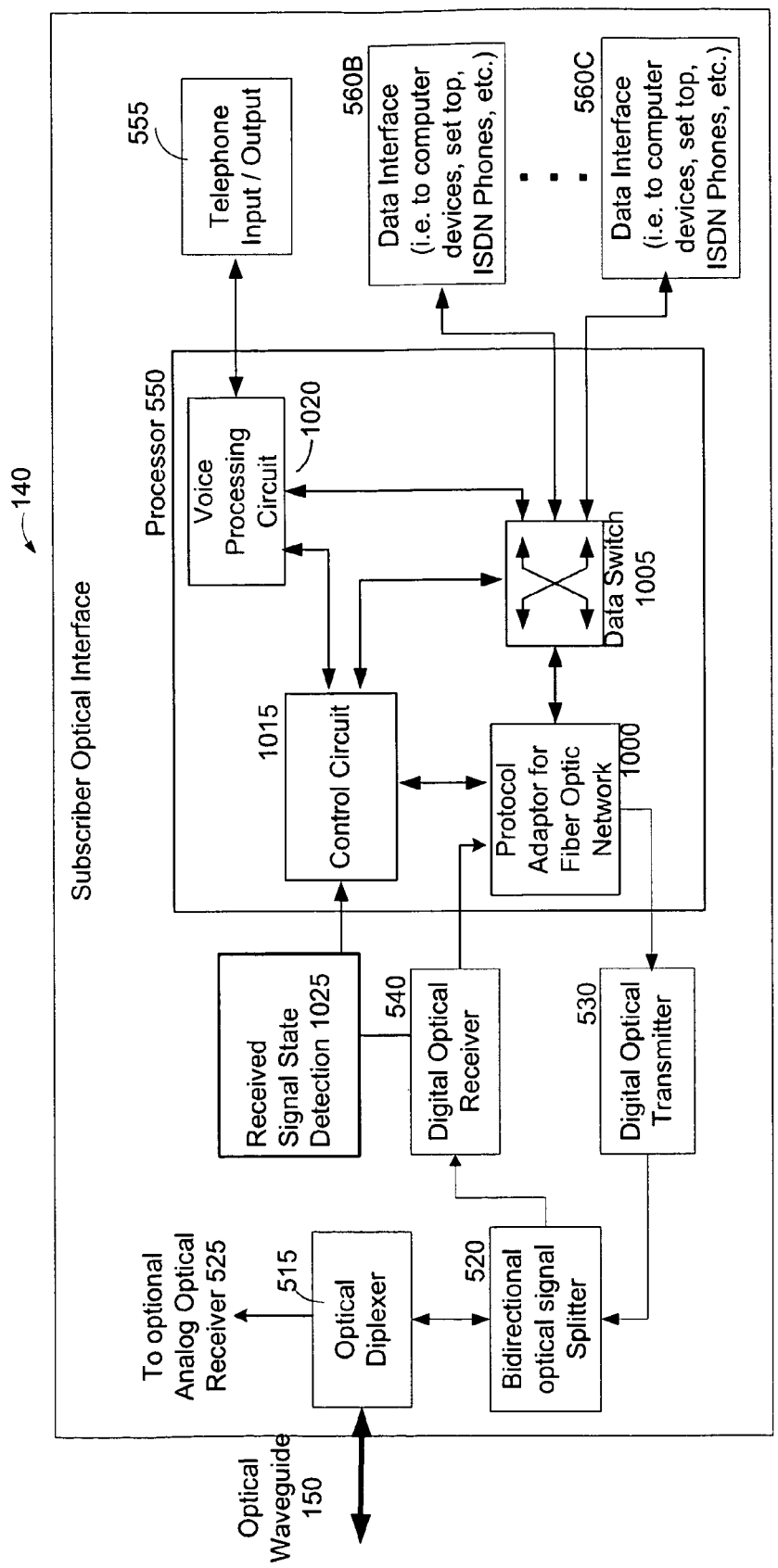
FIG. 5 is a functional block diagram illustrating more details of a subscriber optical interface according to one exemplary embodiment of the invention.

According to one aspect of the technology, one data interface 560 of the subscriber optical interface 140 is used as the connection to data equipment that needs the protection of a redundant communication path. This subscriber optical interface 140 is connected to a first PON. A second data interface 560 (not illustrated in FIG. 4, but see FIG. 5) on that same subscriber optical interface 140 is connected to a data interface 560 on a second subscriber optical interface 140 as illustrated in FIG. 5. The second subscriber optical interface 140 is connected to a second PON in order to provide redundancy.

Referring now to FIG. 5, this figure is a functional block diagram illustrating more details of a subscriber optical interface 140 according to one exemplary embodiment of the invention. Specifically, FIG. 5 illustrates further details of the processor 550 of the subscriber optical interface 140.

The processor 550 has been expanded to show that it comprises a protocol adaptor 1000 which converts bi-directional data between the externally-managed protocol (to the right of the adaptor 1000) and the protocol used on the PON (to the left of the adaptor 1000). The subscriber optical interface 140 also comprises a data switch 1005, which connects data between the protocol adaptor 1000, voice processing circuit 1020 and at least one data interface 560. The voice processing circuit 1020 typically comprises a digital signal processor or other similar programmable circuitry that performs VoIP codecs, echo cancellation, and dual-tone multi-frequency (DTMF) tone generation and detection. The voice processing circuit 1020 can support VoIP protocols such as Media Gateway Control Protocol (MGCP), Session Initiation Protocol (SIP), and other similar protocols. The voice processing circuit 1020 can further comprise an analog telephone interface so that traditional DTMF phones can be used by the subscriber.

One of ordinary skill in the art recognizes that that a data switch 1005 can change or switch data between any of its ports according to a number of rules that are a common part of Ethernet, Internet Protocol, and other standards that are well-known to one of ordinary skill in the art. In addition, a control circuit 1015 can establish unique rules for switching between the primary communication path 155 and the secondary communication path 165.

According to one exemplary embodiment, the control circuit 1015 can comprise a general-purpose central processing unit executing embedded software programs. Examples can include, but are not limited to, power performance computing (PowerPC or PPC) type high-performance processors and Advanced RISC Machine (ARM) type thirty-two bit processors. According to alternate exemplary embodiments, the control circuit 1015 can comprise application specific integrated circuits (ASICs) and other like programmable circuitry. An ASIC embodying a control circuit 1015 may further comprise a central processing unit (CPU) embedded therein.

According to another exemplary embodiment, the control circuit 1015, protocol adaptor 1000, and data switch 1005 may be integrated onto a single chip which may further comprise a central processing unit (CPU). Such an exemplary embodiment may be referred to as systems on a chip (SOCs). Other less preferred but possible exemplary embodiments can include, but are not limited to, forming the control circuit 1015 using field programmable gate arrays (FPGAs). One of ordinary skill in the art recognizes that other physical configurations are possible and are not beyond the invention.

The control circuit 1015 accepts input from a number of sources and can determine the rules by which data switch 1005 manages the flow of communications data.

One of the inputs to control circuit 1015 comprises a signal detected by the received signal state detector 1025, which informs the control circuit 1015 if there is sufficient received optical power to ensure reliable reception of data for the subscriber optical interface 140. The signal state detector 1025 can monitor any loss of light present at the digital optical receiver 540, which typically comprises a photodiode.

If the received signal state detector 1025 output informs control circuit 1015 that the received optical signals from the optical network are too low for reliable reception of data, then control circuit 1015 will issue instructions for the data switch 1005 on how to manage incoming and outgoing data. The control circuit 1015 can also monitor the report of the optical signals from the protocol adaptor 1000. The contents of the report can comprise bit errors, threshold crossings, PON registration identification of the subscriber optical interface, and other performance related metrics defined in the protocol used for the optical signals. The control circuit 1015 and data switch 1005 can execute software which performs the functions described above.

Figure 6:
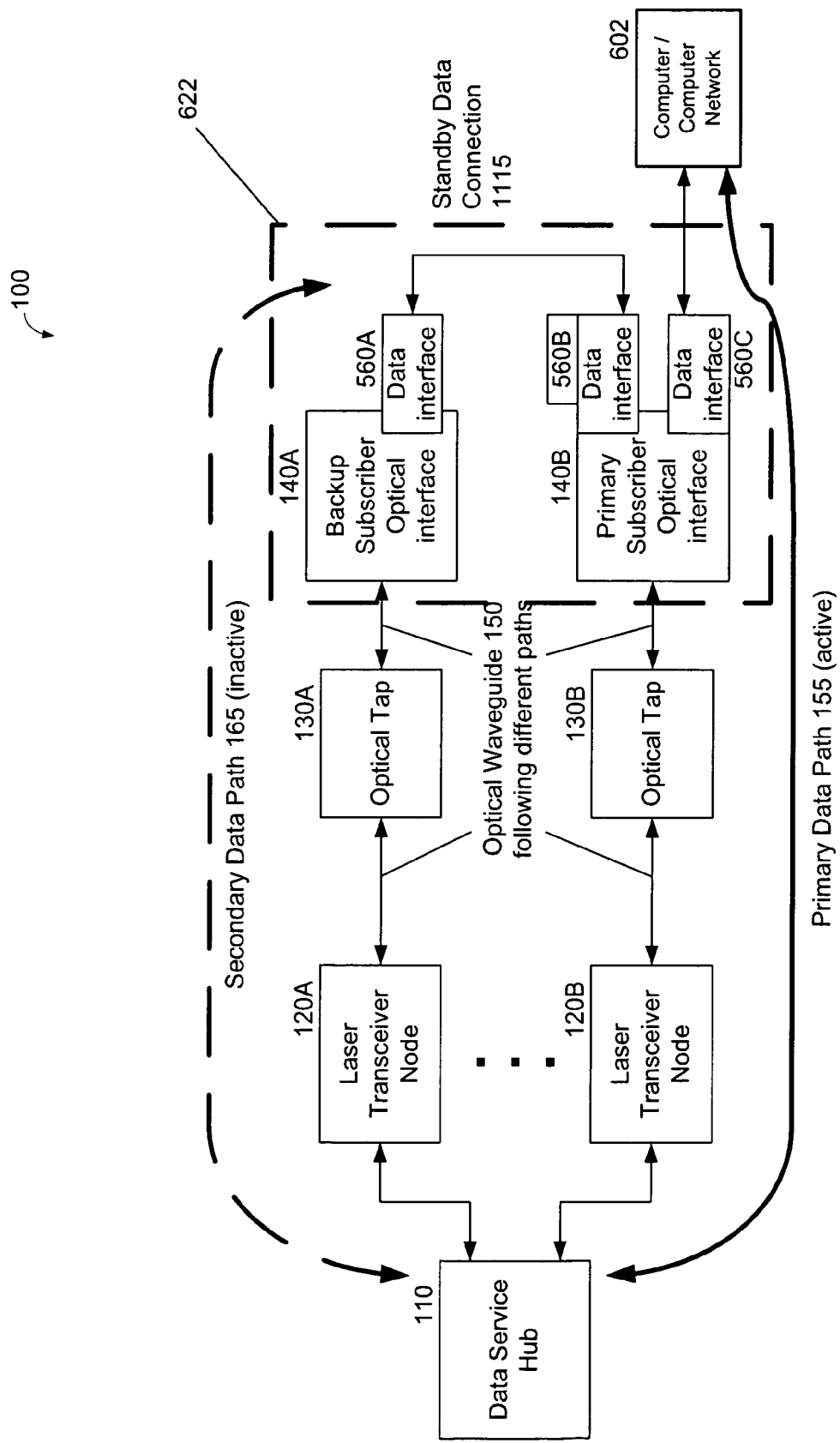
FIG. 6 is a functional block diagram illustrating an active primary communication path comprising a first passive optical network (PON) and an inactive secondary communication path comprising a second passive optical network (PON) according to one exemplary embodiment of the invention.

Referring now to FIG. 6, this figure is a functional block diagram illustrating an active primary communication path 155 comprising a first passive optical network (PON) and an inactive secondary communication path 165 comprising a second passive optical network (PON) according to one exemplary embodiment of the invention. According to this exemplary embodiment, two subscriber optical interfaces 140 can be located at the same customer location. The two subscriber optical interfaces 140A, 140B can be housed separately or they can be contained within a single housing 622 as illustrated with the dashed box surrounding the interfaces 140 in FIG. 6.

The two subscriber optical interfaces 140 are connected to two different optical taps 130 and to two different laser transceiver nodes 120. According to another exemplary embodiment of the invention, two optical taps 130 may be coupled to the same laser transceiver node 120, and even to the same PON on the laser transceiver node 120 as illustrated in FIG. 8 which will be described below.

To maximize the effectiveness of the invention, the optical waveguides 150 supplying signals to the two subscriber optical interfaces 140 usually should travel on two different physical paths 155, 165. According to a preferred, yet exemplary embodiment, the two paths 155, 165 are completely physically separate and independent of one another between the subscriber optical interface 140 and the data service hub 110 as illustrated in FIG. 6.

As shown in FIG. 6, subscriber optical interface 140B is the primary communication device for a subscriber and it is coupled to a computer 602. The computer 602 may also represent a computer network for a subscriber, in which the computer network is coupled to the data interface 560. In either scenario, the computer or computer network 602 must be protected from a failure in the primary communication path 155.

FIG. 6 illustrates the normal operation of the system with the primary communication path 155 being active in which data flows from and is sent to computer 602 through the following: the data interface 560C, the subscriber optical interface 140B, the optical tap 130B, and laser transceiver node 120B, and the data service hub 110. As is understood to one of ordinary skill in the art, this primary communication path may be defined by a virtual local area network (VLAN). A VLAN typically comprises a group of hosts with a common set of attributes that communicate as if they were attached to a Broadcast domain, regardless of their physical location.

A VLAN has the same attributes as a physical LAN, but it allows for end stations to be grouped together even if they are not located on the same network switch. Network reconfiguration can be done through software instead of physically relocating devices. The protocol most commonly used as of this writing in configuring VLANs is IEEE 802.1Q. This standard provides multivendor VLAN support. The standard's tagging performs "explicit tagging" in which each data frame itself is tagged with VLAN information. The 802.1Q standard uses a frame-internal field for tagging, and may modify the Ethernet frame. This internal tagging is what allows the IEEE 802.1Q standard to work on both access and trunk links: packets can be standard Ethernet, and so can be handled by commodity hardware. Specifically, a VLAN may add one or more tags, or identifications, to the header of every packet that is part of the VLAN. The network then treats all of those packets as if they were the only ones traversing the network, though in fact, other packets from other users which are not similarly tagged may traversing the network and flowing across the same communication paths 155, 165.

Other ways of defining the primary and secondary communication paths 155, 165 are possible, but use of a VLAN is common and well understood to one of ordinary skill in the art. In the exemplary embodiments of the invention, VLANs are used to manage the traffic that is to be backed up, but other methods of managing the traffic are within the scope of the invention. For example, in an alternative exemplary embodiment, standard L3 routing can be employed by which the subscriber optical interface 140 and the computer network 602 obtain network access by first establishing a route table for establishing the physical ports that receive and forward the communication packets.

As illustrated in FIG. 6, two subscriber optical interfaces, 140A and 140B are used to support the primary and secondary communication paths 155, 165. The primary subscriber optical Interface 140B usually must have at least two data interfaces 560B and 560C. The backup subscriber optical Interface 140A usually must have at least one data interface 560A. A standby data connection 1115, that may comprise a physical electrical cable, may couple a port on the primary subscriber optical Interface 1408 to the backup subscriber optical interface 140A.

In order to provide for data flow, a VLAN is established through all of the devices shown in the primary data path 155. In addition, this same VLAN is established for the secondary data path 165, from the data service hub 110 through backup subscriber optical interface 140A and data Interface 560A. This VLAN is set up for the secondary communication path 165, but no data is flowing through the secondary communication path 165 because the control circuit 1015 (not illustrated in FIG. 6, but see FIG. 5) in the primary subscriber optical interface 140B is telling the switch 1005 (see FIG. 5) to switch all data traffic in the VLAN between data interface 560C and its own protocol adaptor 1000. The protocol adaptor 1000 generally comprises a Gigabit PON (GPON) or Ethernet PON (EPON) interface circuitry. Such circuitry can translate communications propagated according to an optical network protocol to protocols used in the electrical domain, such as the Ethernet protocol.

Figure 7:
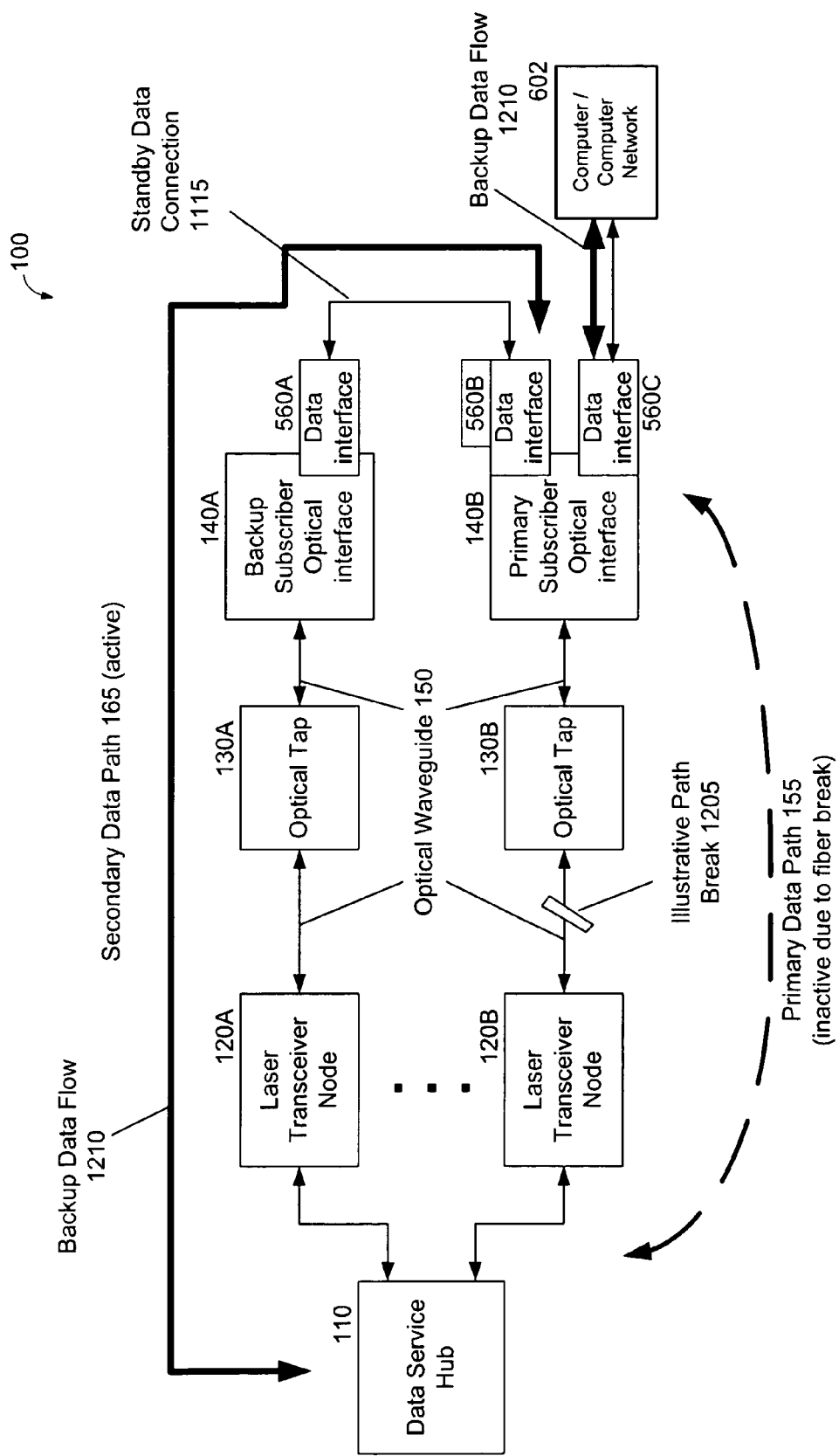
FIG. 7 is a functional block diagram illustrating an inactive primary communication path comprising a first passive optical network (PON) and an active secondary communication path comprising a second passive optical network (PON) according to one exemplary embodiment of the invention.

Referring now to FIG. 7, this figure is a functional block diagram illustrating an inactive primary communication path 155 comprising a first passive optical network (PON) and an active secondary communication path 165 comprising a second passive optical network (PON) according to one exemplary embodiment of the invention. Specifically, FIG. 7 illustrates a scenario or situation when the primary communication path 155 is broken or interrupted, as depicted by an exemplary cable break 1205.

As soon as the cable break 1205 occurs, control circuit 1015 (see FIG. 5) receives a communication from the signal state detector 1025 that a drop in light level or amplitude has occurred in the optical network. Upon receiving this communication that the received optical signals from the PON have dropped below an acceptable level or if they have been dropped completely, the control circuit 1015 immediately instructs the data switch 1005 to take all of the communication traffic and re-route it from the protocol adaptor 1000 to the data interface 560B.

In a single VLAN exemplary embodiment, this means that when switching from the primary to the secondary path occurs, the destination MAC address of the upstream packets generated by the data switch 1005 does not need to be relearned or become newly identified by the optical tap routing device 435 in the laser transceiver node 120.

In an exemplary embodiment in which the primary path 155 is designated as a first VLAN and the secondary path 165 is designated as a second VLAN, usually there will be at least three subscriber optical interfaces 140. In such an exemplary embodiment with three subscriber optical interfaces 140, all of the subscriber data interfaces 560 can use the same first VLAN for communication to the data service hub 110 via the primary path 155. In this exemplary three subscriber optical interface 140 scenario, it is envisioned that usually only one subscriber will pay for the redundant protection (the secondary path 165). Therefore, upon failure and switching to the secondary path 165 which comprises the second VLAN, the second VLAN will be used just to reroute that particular subscriber who is paying for the redundant or back-up protection.

Specifically, in either exemplary embodiment, the data routed to the data interface 560B flows to the back up data interface 560A of the backup subscriber optical interface 140A through the standby data connection 1115. Meanwhile, at the data service hub 110, the optical tap routing device 435 may detect data now flowing from the secondary communication path 165 rather than the primary communication path 155.

In the exemplary embodiment of a single VLAN, the optical tap routing device 435 may determine that a media access control (MAC) address moved from the input for primary communication path 155 to the input for secondary communication path 165. Thus, the optical tap routing device 435 simply starts routing outgoing/downstream traffic to the secondary communication path 165 by switching from one port to another.

According to one exemplary embodiment, the measured switching time for switching data flow from the primary communication path 155 to the secondary communication path 165 falls generally between about fifteen milliseconds to about twenty milliseconds, which is well within the industry standard/expectation of about fifty milliseconds. Generally, if communication paths are switched within or less than fifty milliseconds, such switching is not perceivable by a subscriber who sending or receiving data across the optical network system 100.

One aspect of the invention for achieving fast switching speed between the primary and secondary communication paths 155, 165 is to rapidly detect loss of the primary communication path 155. In the illustrative and exemplary embodiment, this sensing can be achieved by detecting a drop in optical signal power, which is monitored by the received signal state detector 1025 of FIG. 5. However, this is not the only method to detect loss of the primary communication path 155.

For example, it is possible to detect a loss of data transitions in data coming into, or going out of, protocol adaptor 1000. Detecting loss of data transitions with the protocol adaptor 1000 can identify other failures in addition to the loss of the light in the primary communication path 155. These other types of failures can include, but are not limited to, excessive bit and frame error rates, loss of registration identification for the subscriber optical interface, and other similar and possible errors.

When the primary communication path 155 is restored, it is important to switch back to this communication path 155 again within a fifty millisecond window so that such switching is not readily perceivable by a subscriber of the communication paths 155, 165. It is not necessary to immediately switch back to the primary communication path 155 when the primary communication path 155 is restored, and in fact, it is usually preferable to wait some length of time (e.g., a few minutes) before initiating the switch, in order to ensure that the restored communication path 155 is stable. But when the switch from the secondary communication path 165 to the primary communication path 155 is to occur, the total elapsed time should be within the fifty millisecond threshold mentioned above.

For example, when splicing an optical connection in the field, it is possible that the light supporting communications in an optical waveguide of a primary communication path 155 may appear for a short time before being interrupted again due to the way the splicing process works. If the light within the optical waveguide of a primary communication path 155 is stable for some length of time, then it is usually safe to assume that a full restoration of an optical communication path has been made.

When the control circuit 1015 of the primary subscriber optical interface 140 is satisfied that a stable primary communication path 155 exists, it instructs data switch 1005 to again route traffic for the subject PON between protocol adaptor 1000 in the primary subscriber optical interface 140B and data Interface 560C. Thus, the primary communication path 155 is restored, and the normal condition of FIG. 6 in which the primary communication path 155 is active (while the secondary communication path 165 is inactive) is again achieved. The switching can be time based (using a configurable Hold time) or entirely by a manual action.

When normal operation (via the primary communication path 155) is in effect, it is important to recognize the possibility of a loss of the secondary communication path 165 or the standby data connection 1115. Since the secondary communication path 165 is usually not carrying data, a method should be used to recognize failures in the backup path when and if such failures occur.

For example, the secondary communication path 165 may not be needed for months. If a failure such as a break or cut occurs in the secondary communication path 165, and if the primary communication path 155 also experiences a failure at the same time, then the secondary communication path 165 will not be available as a backup or alternate route for the communications flowing over the primary communication path 155. A failure in the secondary communication path 165 can be detected by the Laser transceiver node 120A and an Element Management System 447 (EMS, FIG. 3) can report the loss. Specifically, an optical tap routing device 435 of a laser transceiver node 120 can detect failures in the secondary communication path 165.

A failure in the secondary communication path 165, such as in the standby data connection 115 between the backup subscriber optical interface 140A and the primary subscriber optical interface 140B, can be detected by a heartbeat mechanism supported between these two devices which may be reported up to the EMS to report the loss via a trap mechanism. The heartbeat mechanism may comprise the following: the primary subscriber optical interface 140B can be programmed to send a periodic message to laser transceiver node 120A by way of standby data connection 1115 and the secondary data path 1110. Specifically, the control circuit 1015 can send the periodic message to the optical tap routing device 435 of the laser transceiver node 120. If the laser transceiver node 120A, and specifically the optical tap routing device 435, fails to receive this message on schedule, it may report a failure to the EMS 447, which in turn reports it to the human operator, who fixes the problem before the secondary communication path 165 is needed.

Besides protecting data, the inventive system 100 can protect voice calls passing through voice processing circuit 1020 of FIG. 5. The voice calls can be protected by routing those signals through the secondary communication path 165 when the primary communication path 155 experiences a failure.

Referring now to FIG. 8, this figure is a functional block diagram illustrating an active primary communication path 155 comprising a passive optical network (PON) and an inactive secondary communication path 165 comprising hardware that is coupled to the same passive optical network (PON) of the primary communication path according to one exemplary embodiment of the invention. Specifically, in this exemplary embodiment, two separate communication paths 155, 165 are coupled to the same laser transceiver node 120 and thus, are part of the same PON. The primary communication path 155 comprises the primary subscriber optical interface 140B, and optical taps 130B,C. The secondary communication path 165 comprises the standby data connection 1115, the data interface 560A, the secondary subscriber optical interface 140A, and optical taps 130A,C.

This means that redundancy only exists between the laser transceiver node 120 and the subscriber optical interfaces 140. If a failure occurs upstream relative to the laser transceiver node 120, then there is no redundant or back up communication path and all communications from and to the data service hub 110 could be lost. While this exemplary embodiment may afford less protection relative to the full redundancy illustrated in FIGS. 6-7 discussed above, this exemplary embodiment may be preferred in some situations since it may provide redundancy at a lower cost relative to the full redundancy model simply since less hardware and software is present.

One of ordinary skill in the art recognizes that other secondary communication paths 165 with different sizes/equipment are well within the scope of the invention. For example, the primary and secondary communication paths 155, 165 could share a single optical tap 130C instead of utilizing the three optical taps 130A, B, C as illustrated in FIG. 8 without departing from the invention and in order to provide a smaller scaled backup solution.

Figure 9:
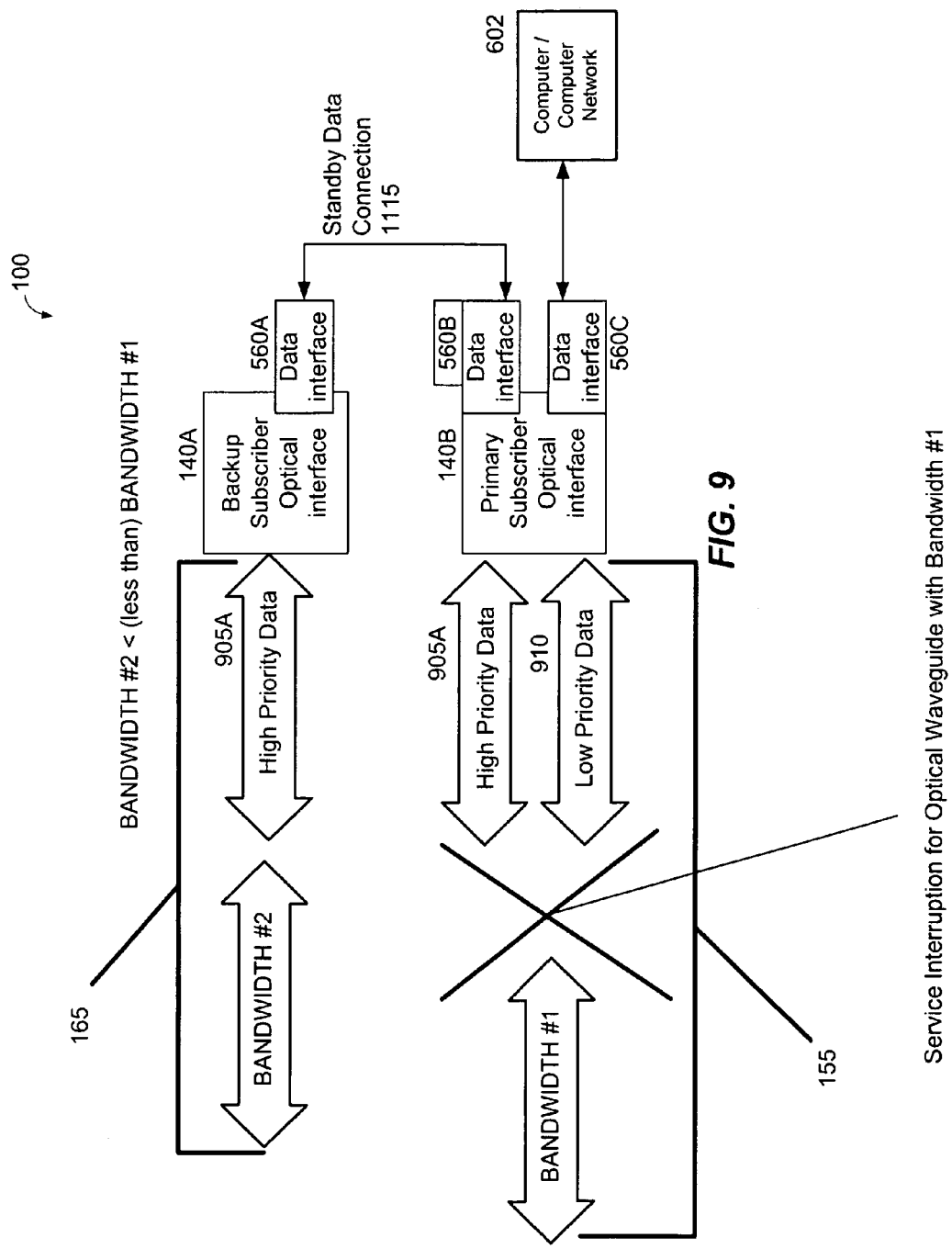
FIG. 9 is a functional block diagram illustrating a primary communication path having a first bandwidth and a second communication path with a second bandwidth that may be less than the first communication path according to one exemplary embodiment of the invention.

Referring now to FIG. 9, this figure is a functional block diagram illustrating a primary communication path 155 having a first bandwidth and a second communication path 165 with a second bandwidth that may be less than the first communication path according to one exemplary embodiment of the invention. This means that with the inventive system 100, more than one protected VLAN can be established, and there can be other VLANs established which are unprotected.

Communications of each VLAN can be assigned a certain priority. Specifically, communications of each VLAN can be assigned lower priority settings using the known 802.3q Quality of Service (QoS) settings. For example, communications of a first VLAN may be assigned as "High Priority Data" 905. Meanwhile, communications of a second VLAN may be assigned as "Low Priority Data" 910. Alternatively, within a single LAN system, communications can also be assigned these two different priorities. The QoS settings are well known to one of ordinary skill in the art.

The system 100 may be set up whereby the primary and secondary communication paths 155, 165 are used to provide more capacity during normal operation. During abnormal operation, when either communication path 155, 165 is disabled, data traffic assigned as low priority data 910 may be dropped or delayed while data assigned as high priority data 905 may be maintained at its current speed and not dropped. This means that high priority data 905 will pass substantially normally throughout the system 100 while the low priority data 910 may be delayed or completely eliminated while one of the communication paths 155, 165 is down.

Figure 10:
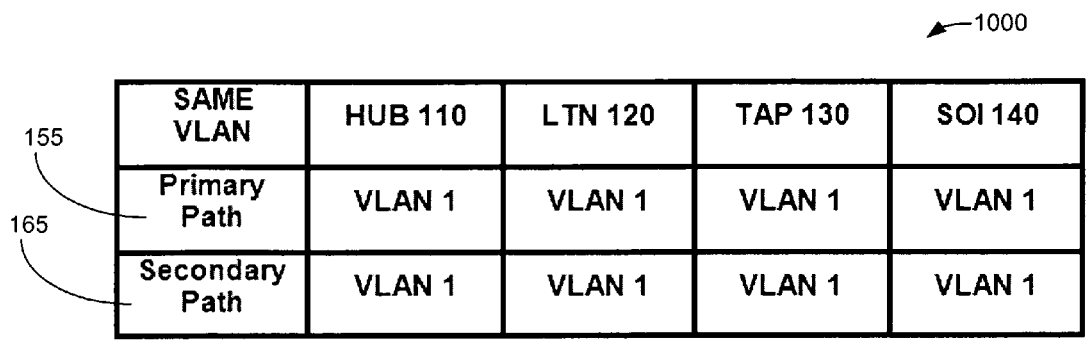
FIG. 10 illustrates a chart in which a primary communication path and a secondary communication path are defined by a single virtual local area network (VLAN) according to an exemplary embodiment of the invention.

FIG. 10 illustrates a chart 1000 in which a primary communication path 155 and a secondary communication path 165 are defined by a single virtual local area network (VLAN) according to an exemplary embodiment of the invention. As illustrated in the chart, each element in a respective communication path 155, 165 may be assigned to the same VLAN. As discussed above with respect to FIG. 9, while each element of each path 155, 165 may be assigned to the same VLAN, it is possible that individual communications are assigned different priorities to add a degree of flexibility to the system in which the secondary communication path 165 is used simultaneously while the primary communication path 155 is active.

Figure 11:
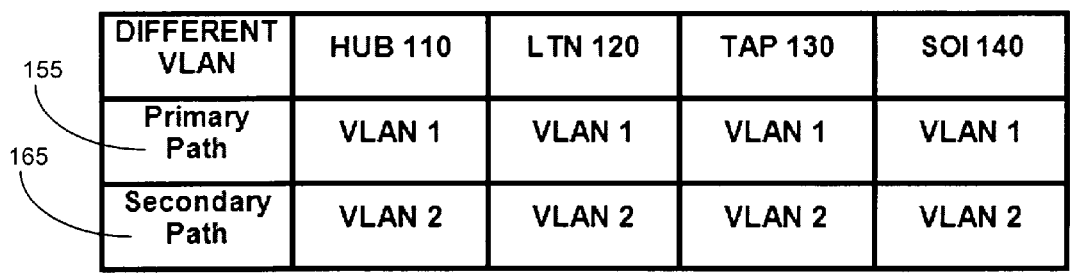
FIG. 11 illustrates a chart in which a primary communication path and a secondary communication path are defined by two different virtual local area networks (VLANs) according to an exemplary embodiment of the invention.

FIG. 11 illustrates a chart 1100 in which a primary communication path 155 and a secondary communication path 165 are defined by two different virtual local area networks (VLANs) according to an exemplary embodiment of the invention. As illustrated in the chart, each element in a respective communication path 155, 165 may be assigned to a different VLAN. In this exemplary embodiment, when the primary communication path 155 experiences a failure, then all of its communication can be re-routed across the second VLAN2 of the secondary communication path 165.

Alternatively, similar to the single VLAN embodiment illustrated in FIG. 10, each VLAN can be assigned a priority which is different relative to the other VLAN and both VLANs can be simultaneously active. When one of the communication paths 155, 165 experiences a failure, then the data of the higher priority VLAN may be routed across the remaining communication path 155 or 165 while data containing the lower priority VLAN can be delayed or dropped.

Figure 12:
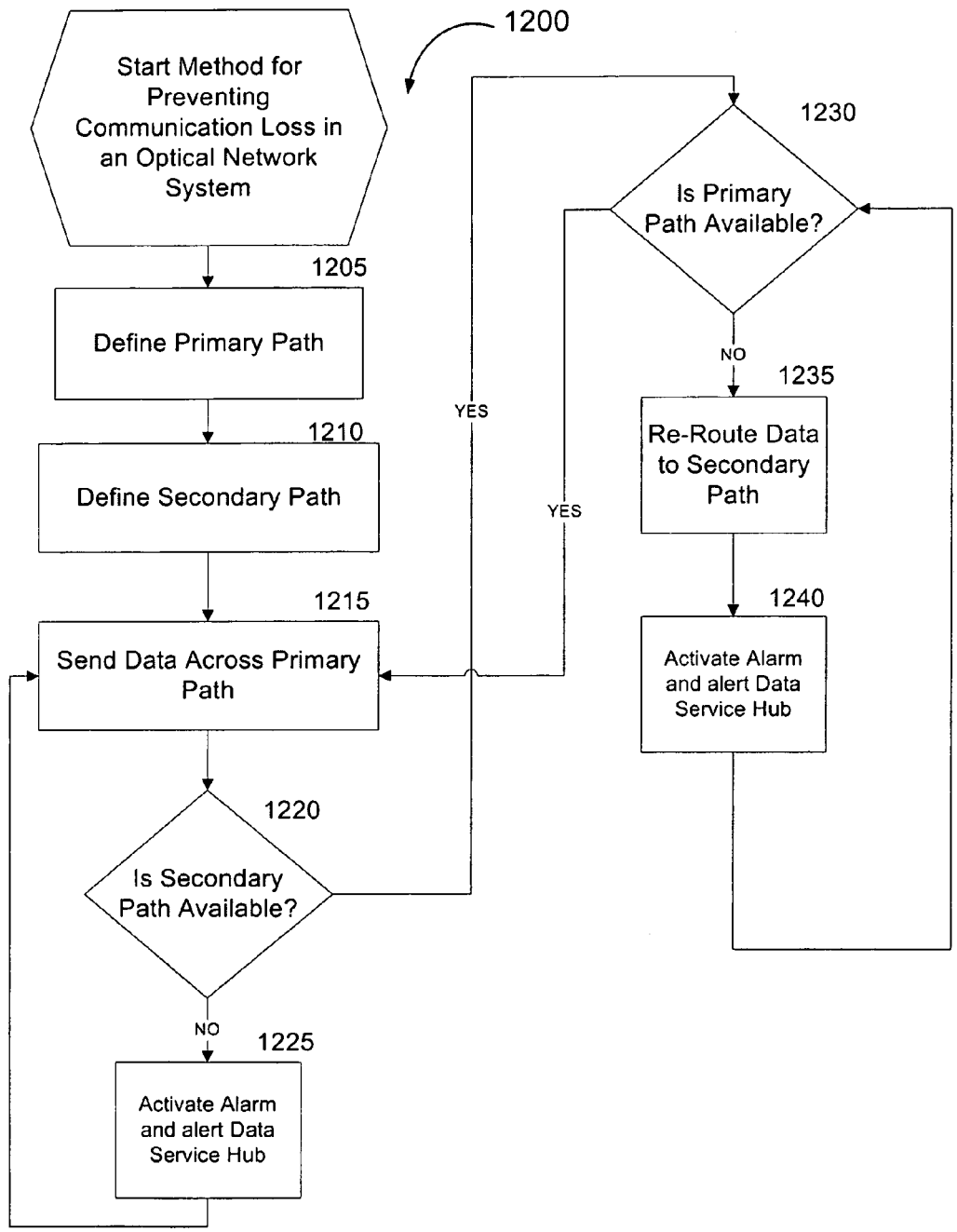
FIG. 12 is a logic flow diagram illustrating some steps of a method for protecting against communication loss in an optical network system according one exemplary embodiment of the invention.

FIG. 12 is a logic flow diagram illustrating some steps of a method 1200 for protecting against communication loss in an optical network system 100 according one exemplary embodiment of the invention. Certain steps in the processes or process flow described in the logic flow diagram referred to in this specification must naturally precede others for the invention to function as described. However, the invention is not limited to the order of the steps described if such order or sequence does not alter the functionality of the present invention. That is, it is recognized that some steps may perform before, after, or parallel other steps without departing from the scope and spirit of the invention.

One of ordinary skill in the art will appreciate that the functions of the subscriber optical interface 140, and specifically, the function of the control circuit 1015 and adaptor 1000, can comprise firmware code executing on a microcontroller, microprocessor, a digital signal processor (DSP), or state machines implemented in application specific integrated circuits (ASICs) or programmable logic, programmable circuitry, or other numerous forms without departing from the spirit and scope of the invention. In other words, these steps illustrated in FIG. 12 of this disclosure may be provided as a computer program which may include a machine-readable medium having stored there on instructions which may be used to program a computer (or other electronic devices) to perform a process according to the invention. The machine-readable medium may include, but is not limited, floppy diskette, optical disk, CD-ROM, magneto-optical disks, ROMs, RAMs, EEPROMs, EEPROMs, magneto-optical cards, flash memory, or other type of medias/machine-readable mediums suitable for storing electronic instructions.

Further, one of ordinary skill in programming would be able to write computer program(s) or identify appropriate hardware at circuits to implement the disclosed invention without difficulty based on the flow charts and associated description in the application text. Therefore, disclosure of a particular set of program code instructions or detailed hardware devices is not considered necessary for an adequate understanding of how to make and use the invention. The inventive functionality of the claimed computer implemented processes will be explained in more detail in the following description and in conjunction with the remaining figures.

The first step of the method 1200 is step 1205 in which the primary communication path 155 is defined. In this step, a primary communication path 155 may be assigned as a first VLAN in which the optical tap routing device 435 of the laser transceiver node 120 and the protocol adaptor 1000 and data switch 1005 are configured with initial settings. The first VLAN may be monitored by the control circuit 1015 and the data switch 1005. Alternatively, the primary communication path 155 can be physically established in which the control circuit 1015 activates the data switch 1005 in order to turn data flow "off" or "on" relative to the primary communication path 155.

Next in step 1210, the secondary communication path 165 can be defined. Like the first step 1205, a second communication path 165 may be assigned to a second VLAN relative to the first VLAN described in step 1205 in which the optical tap routing device 435 of the laser transceiver node 120 and the control circuit 1015 and the data switch 1005 are configured with initial settings. Alternatively, the second communication path may be assigned to the same first VLAN as the first communication path 155. Further, the secondary communication path 165 can be physically set in which the control circuit 1015 only activates the data switch 1005 in order to turn data flow "off" or "on" relative to the secondary communication path 165.

Subsequently, in step 1215, data can be sent across the primary communication path. In decision step 1215, it is determined if the secondary communication path 165 is available. In this step, the heartbeat mechanism discussed in connection with FIG. 7 may be employed. According to this heartbeat mechanism, the primary subscriber optical interface 140B can be programmed to send a periodic message to laser transceiver node 120A by way of standby data connection 1115 and the secondary data path 1110. Specifically, the control circuit 1015 of the subscriber optical interface 140 can send the periodic message to the optical tap routing device 435 of the laser transceiver node 120. Alternatively, the optical tap routing device 435 of the laser transceiver node 120 may send periodic messages or "pings" to the control circuit 1015 of the secondary subscriber optical interface 140A to see if the control circuit 1015 responds.

Then, in decision step 1220, if the laser transceiver node 120A, and specifically, the optical tap routing device 435, determines that the secondary communication path 155 is not available, then the process proceeds to step 1225. In decision step 1220, the optical tap routing device 435 may be determining if it has not received its periodic message originating from the control circuit 1015 of the secondary subscriber optical interface 140A. Alternatively, if the optical tap routing device 435 is responsible for sending out pings to the control circuit 1015, then it may have determined that the control circuit 1015 of the secondary subscriber optical interface 140A has not responded to the pings of the optical tap routing device 435.

In step 1225, the optical tap routing device 435 may activate an alarm in the data service hub 110 or it may alert the EMS. In EMS case, the EMS may generate and send messages to a human operator in the form of SMS text messages, e-mails, pages, automated phone calls, etc. The process then returns to step 1215 in which data continues to be sent across the primary communication path 155.

If the inquiry to decision step 1220 is positive, meaning that the optical tap routing device 435 has received the "heartbeat" message originating from the control circuit 1015 or that the control circuit 1015 of the secondary subscriber optical interface 140A has responded to a ping originating from the optical tap routing device 435, then the process proceeds to decision step 1230.

In decision step 1230, it is determined whether the primary communication path 155 is available. In this step, the control circuit 1015 continuously checks for levels monitored by the signal state detector 1025. When the optical level drops below an acceptable threshold for reliable optical communications, the signal state detector 1025 can convey this level of signal to the control circuit 1025 during the control circuit's check of the state detector.

Simultaneously and in addition to the control circuit 1015 and signal state detector 1025, in step 1230, the optical tap routing device 435 can also monitor a heart beat signal sent by the control circuit 1015 to determine if the primary communication path 155 is available. Alternatively, the optical tap routing device 435 could send a ping signal to the control circuit 1015 to determine the status of the primary communication path 155.

If the inquiry to decision step 1230 is positive, then the "Yes" branch is followed back to step 1215 in which data is continued to be sent across the primary communication path 1215. If the inquiry decision step 1230 is negative, then the "No" branch is followed to step 1235. In step 1235, data is re-routed from the primary communication path 155 to the secondary communication path 165. In this step, the control circuit 1015 instructs the data switch 1005 to change data flow so that data routed across the primary communication path 155 is now routed across the secondary communication path 165.

In step 1240, an alarm may be activated so that the data service hub 110 is alerted of the condition of the primary communication path 155. This step is usually performed by the optical tap routing device 435 which either monitors the heart beat signals from the control circuit 1015 of the primary subscriber optical interface 140B or responses to the pings originating from the control circuit 1015 of the primary subscriber optical interface 140B. Also in this step, the optical tap routing device 435 may send a signal to the EMS 447. The EMS 447 may report the failure status of the primary communication path 155 to a human operator who may repair or resolve the failure. The process then returns back to decision step 1230.

One of ordinary skill in the art recognizes that decision step 1220 which checks the status of the secondary communication path 165 and decision step 1230 which checks the status of the primary communication path 155 may be performed in parallel with one another. In this way, if either communication path 155, 165 fails, then appropriate alarms may be activated so that repairs can be made as needed.

Referring now to FIG. 13, this figure illustrates a chart 1300 highlighting various states of a primary communication path and a secondary communication path according to an exemplary embodiment of the invention. In the first column of the chart 1300, a first state for elements of the system 100 is illustrated. According to a first state 1, when the primary communication path 155 is "Up" or operational and the secondary communication path 165 is "Up" or operational state, then the subscriber optical interface 140 and specifically, the control switch 1015 will keep data being sent across the primary communication path 155. In this first state 1, since both communication paths 155, 165 are operational, the data service hub alarm is in the "No" or No-alarm state.

In the second column of the chart 1300, a second state for elements of the system 100 is illustrated. According to the second state 2, when the primary communication path 155 changes from the "Up" or operational state to the "down" or non-operational state, and the secondary communication path is "Up" or in an operational state, then the subscriber optical interface 140 and specifically, the control switch 1015 will have data routed across the secondary communication path 165 after it is switched from the primary communication path 155. In this second state 2, since the primary communication path 155 is in a failed state, the data service hub alarm is in the "Yes" or activated state.

In third column of the chart 1300, a third state for elements of the system 100 is illustrated. According to a third state 3, when the primary communication path 155 changes from the "Down" or failed state to the "Up" or operational state and the secondary communication path is "Up" or operational state, then the subscriber optical interface 140 and specifically, the control switch 1015 will re-route data from the secondary communication path 165 to the primary communication path 155. In this third state 3, since both communication paths 155, 165 are now operational, the data service hub alarm is in the "No" or No-alarm state.

In a fourth column of the chart 1300, a fourth state for elements of the system 100 is illustrated. According to the fourth state 4, when the primary communication path 155 is in the "Up" or operational state and the secondary communication path 165 changes from the "Up" or operational state to the "Down" or failed state, then the subscriber optical interface 140 and specifically, the control switch 1015 will continue sending data across the primary communication path 155. In this fourth state 4, since the secondary communication path 165 is in a failed state, the data service hub alarm is in the "Yes" or activated state.

Alternative embodiments of the data loss protection system 100 will become apparent to one of ordinary skill in the art to which the invention pertains without departing from its spirit and scope. Thus, although this invention has been described in exemplary form with a certain degree of particularity, it should be understood that the present disclosure is made only by way of example and that numerous changes in the details of construction and the combination and arrangement of parts or steps may be resorted to without departing from the scope or spirit of the invention. Accordingly, the scope of the present invention may be defined by the appended claims rather than the foregoing description.

What is claimed is:

1. A system for protecting against communication loss in an optical network system comprising:
   a first subscriber optical interface coupled to a primary communication path, the first subscriber optical interface for receiving downstream optical signals and converting them into an electrical domain, and for converting electrical signals into upstream optical signals, the first subscriber optical interface comprising:
   a signal state detector for sensing if the primary communication path is available to support optical communications;
   a control circuit coupled to the signal state detector and a data switch; and
   a second subscriber optical interface coupled to a secondary communication path and coupled to the first subscriber optical interface via an electrical connection, the second subscriber optical interface for receiving downstream optical signals and converting them into an electrical domain, and for converting electrical signals into upstream optical signals, the control circuit determining if the primary communication path is not available to support optical communications; if the primary communication path is not available, then the control circuit instructs the data switch to re-route data from the primary communication path to the secondary communication path by sending signals to and receiving signals from the second subscriber optical interface, each subscriber optical interface comprising a protocol adapter for translating signals from an optical network protocol to signals propagated according to an electrical network protocol.

2. The system of claim 1, wherein the signal state detector is coupled to a digital optical receiver in order to sense optical levels for optical signals processed by the digital optical receiver.

3. The system of claim 1, wherein the control circuit is coupled to a data switch, the data switch being coupled to the first and second communication paths.

4. The system of claim 1, wherein the primary communication path comprises a passive optical network (PON).

5. The system of claim 4, wherein the passive optical network comprises a laser transceiver node, an optical waveguide, an optical tap, and the first subscriber optical interface.

6. The system of claim 1, wherein the secondary communication path comprises a passive optical network (PON).

7. A system for protecting against communication loss in an optical network system comprising:
   a first subscriber optical interface forming part of a primary communication path, the first subscriber optical interface for receiving downstream optical signals and converting them into an electrical domain, and for converting electrical signals into upstream optical signals; the first subscriber optical interface comprising a signal state detector for sensing if the primary communication path is available to support optical communications;
   a control circuit coupled to the signal state detector and a data switch; and the control circuit determining if the primary communication path is not available to support optical communications; if the primary communication path is not available, then the control circuit instructs the data switch to re-route data from the primary communication path to a secondary communication path exiting the subscriber optical interface which is available for supporting optical communications, a second subscriber optical interface coupled to the secondary communication path and coupled to the first subscriber optical interface via an electrical connection, the second subscriber optical interface for receiving downstream optical signals and converting them into an electrical domain, and for converting electrical signals into upstream optical signals, each subscriber optical interface comprising a protocol adapter for translating signals from an optical network protocol to signals propagated according to an electrical network protocol, wherein the primary and secondary communication paths comprise separate passive optical networks (PONs).

8. The system of claim 7, wherein the signal state detector is coupled to a digital optical receiver.

9. The system of claim 7, further comprising a data service hub, the data service hub sensing if the secondary communication path is available to support optical communications.

10. The system of claim 7, wherein the control circuit is coupled to a data switch, the data switch being coupled to the primary and secondary communication paths.

11. The system of claim 7, wherein the passive optical networks each comprise a laser transceiver node, an optical waveguide, and an optical tap.

12. The system of claim 8, wherein the control circuit is coupled to a data switch, the data switch being coupled to the primary and secondary communication paths.

13. The system of claim 12, wherein the passive optical networks each comprise a laser transceiver node, an optical waveguide, and an optical tap.

14. The system of claim 4, wherein the secondary communication path comprises a passive optical network (PON).

15. The system of claim 14, wherein the control circuit is coupled to a data switch, the data switch being coupled to the first and second communication paths.

16. The system of claim 15, wherein the passive optical networks each comprise a laser transceiver node, an optical waveguide, and an optical tap.

* * * * *